Figure 1:
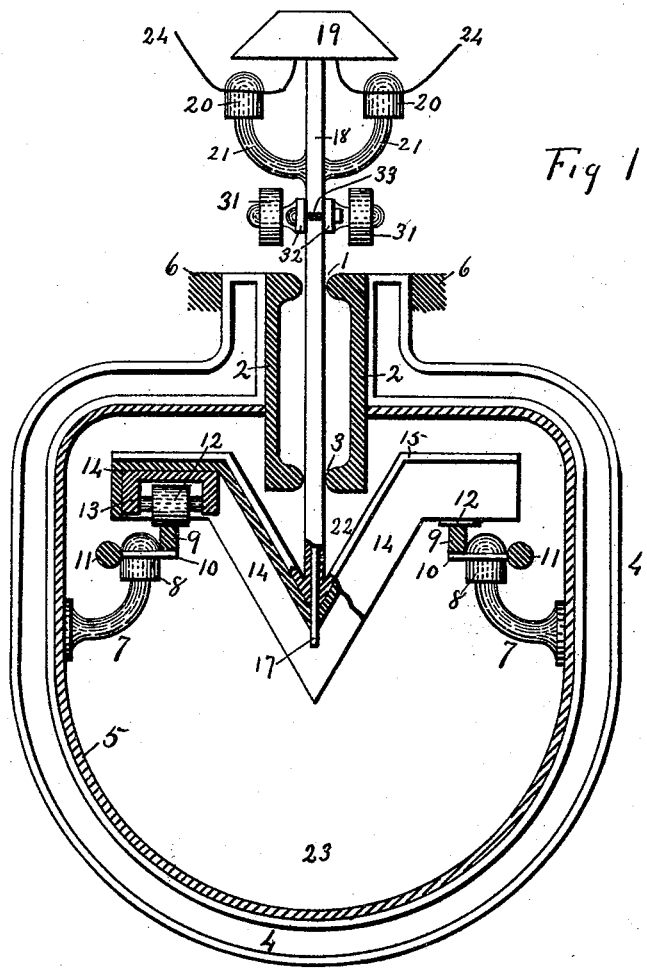

(No Model.)  5 Sheets—Sheet 1.
J. H. BATES.
CONDUIT ELECTRIC RAILWAY.

No. 492,737. Patented Feb. 28, 1893.

WITNESSES:
S. H. Turner.
Samuel B. Feinberg.

James H. Bates
INVENTOR (No Model.) 5 Sheets—Sheet 2.
J. H. BATES.
CONDUIT ELECTRIC RAILWAY.

No. 492,737. Patented Feb. 28, 1893.

WITNESSES:
S. H. Turner,
Samuel B. Feinberg

James H. Bates,
INVENTOR (No Model.) 5 Sheets—Sheet 3.

J. H. BATES.
CONDUIT ELECTRIC RAILWAY.

No. 492,737. Patented Feb. 28, 1893.

WITNESSES:
S. H. Turner
Samuel B. Feinberg

James H. Bates,
INVENTOR (No Model.) 5 Sheets—Sheet 4.
J. H. BATES.
CONDUIT ELECTRIC RAILWAY.
No. 492,737. Patented Feb. 28, 1893.
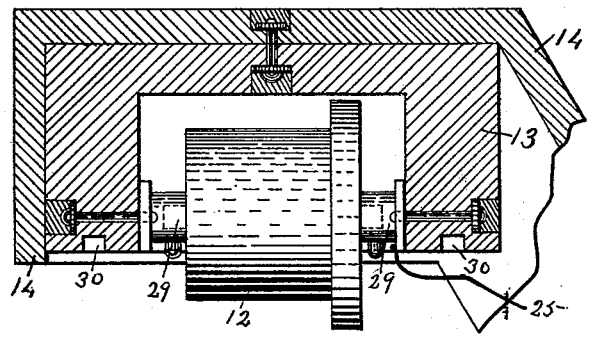
Fig. 5
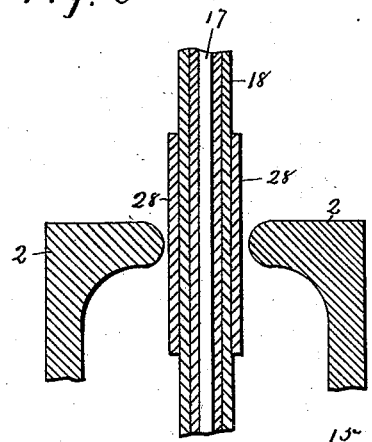
Fig. 6
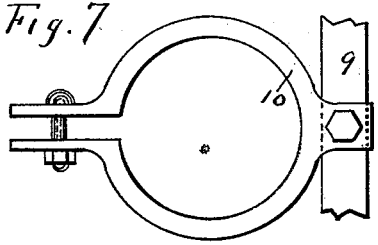
Fig. 7
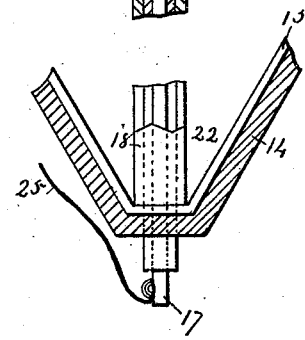
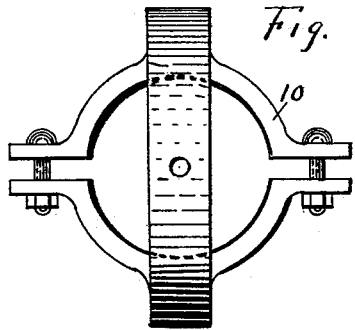
Fig. 9
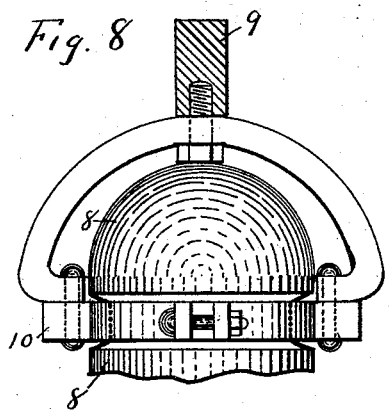
Fig. 8
WITNESSES:
S. H. Turner.
Samuel B. Feinberg.
James H. Bates
INVENTOR

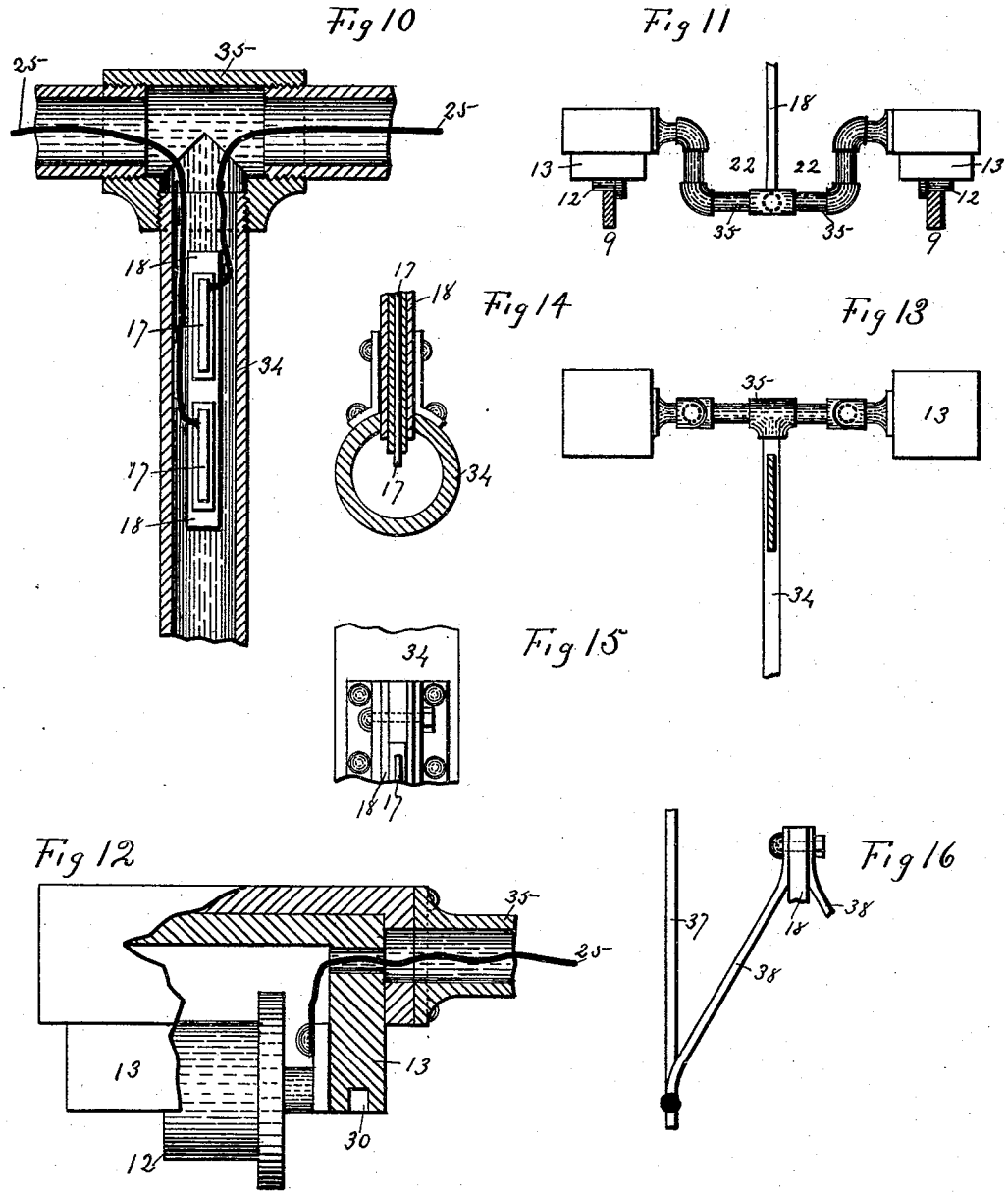

UNITED STATES PATENT OFFICE.

JAMES HERVEY BATES, OF HOBOKEN, NEW JERSEY.

CONDUIT ELECTRIC RAILWAY.

SPECIFICATION forming part of Letters Patent No. 492,737, dated February 28, 1893.

Application filed August 2, 1892. Serial No. 441,912. (No model.)

*To all whom it may concern:*

Be it known that I, JAMES HERVEY BATES, of Hoboken, New Jersey, have invented certain new and useful Improvements in Electric Railways, whereof the following is a specification.

This invention relates chiefly to railways provided with a conduit and operated by electricity taken from a conductor in the conduit.

The invention consists in improvements in the conduit; in the contact trolley; in the relations of these parts to each other, and in certain other matters described hereinafter.

The invention may be best understood from the sub-joined description and the accompanying drawings, of what I consider its best form. I wish it understood, however, that said description and drawings are illustrative merely, and that my invention is not limited to the specific things shown and described.

In their general features the parts shown in the drawings are as follows:—

*The conduit.*—This is of any suitable form and construction. The slot rails are extended below the top of the conduit so as to form a petticoat, as it is technically called, and cause water and dirt entering the slot to be delivered centrally, instead of finding its way to the side of the conduit. Inside the conduit are brackets which support the electric conductor or conductors, and the latter may serve as rails for the trolley to travel on.

*The contact trolley.*—This is in the form of a car traveling in the conduit on rollers upon rails, supported by the brackets in the conduit. The middle part of this trolley is depressed and formed into a gutter under the slot of the conduit, so that water and dirt entering the slot and falling upon the trolley will be received in the gutter and delivered at the ends of the trolley into the body of the conduit and will not go to the sides of the trolley where they would interfere with the electric current. Extending upward from the trolley through the slot are insulated conductors, which convey the current between the main conductor in the conduit and the motors on the cars. The trolley is independent of the car on the track above, but is moved by it by means of chains or other suitable connection. In some cases I have two conductors in the conduit which form a complete circuit through the trolley and the motors in the car above, and in other cases I propose using the ground or the metal work of the permanent way, or both, for the return circuit.

Figure 2:
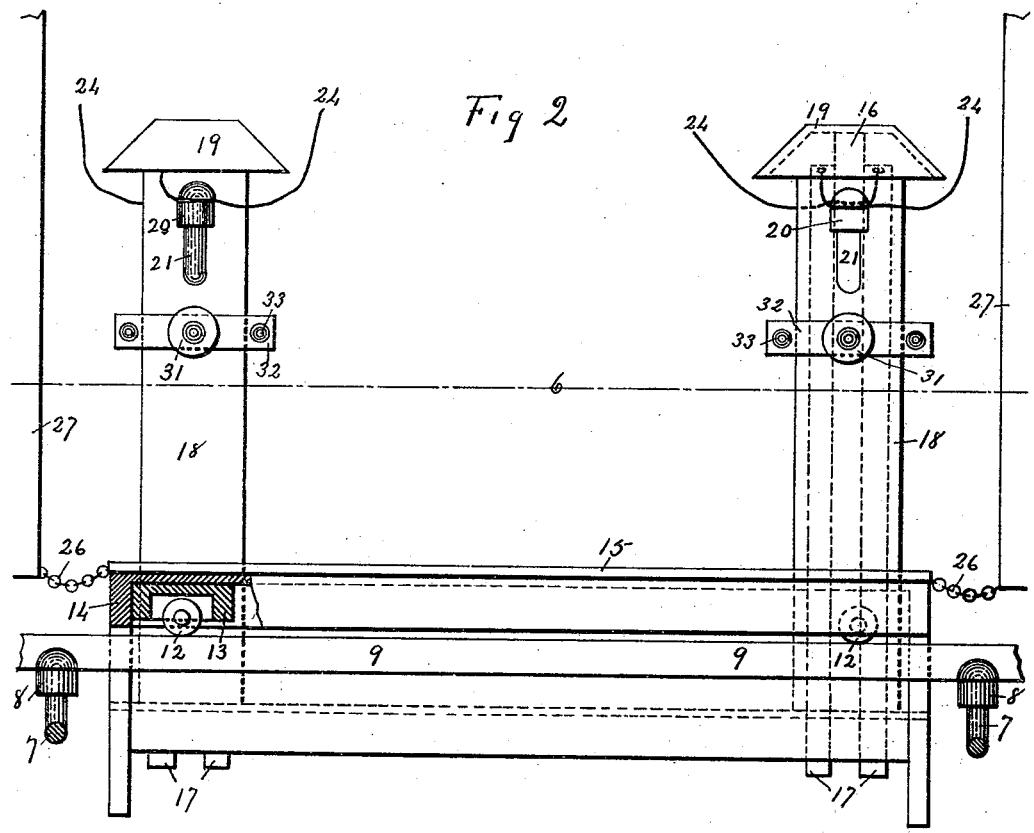
Figure 3:
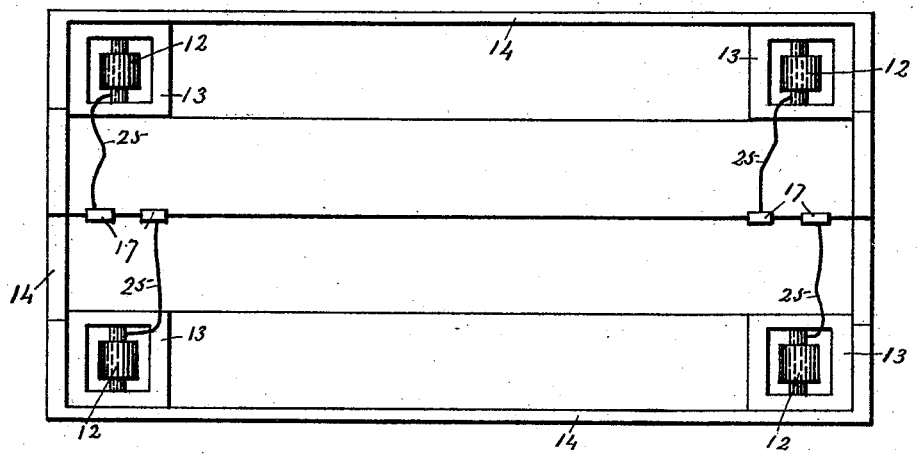
Figure 4:
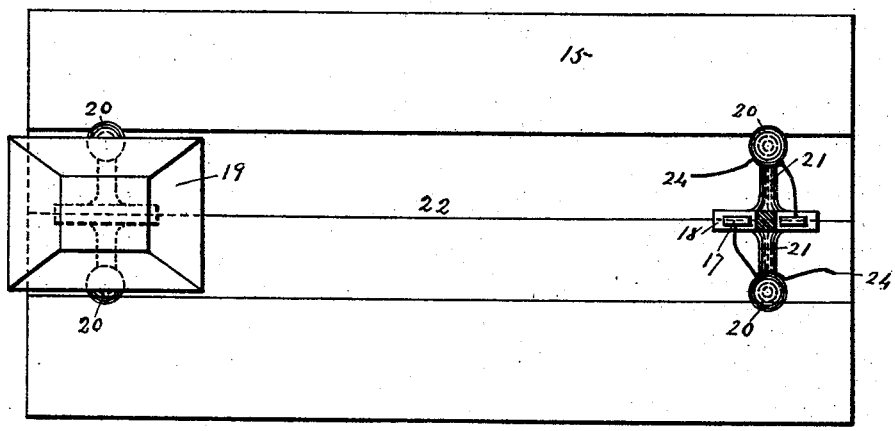

In the drawings:—Figure 1, is a cross section of the conduit, showing the trolley therein, partly in section and partly in end elevation. Fig. 2, is a side elevation of the trolley. Fig. 3, is a bottom view of the same, and Fig. 4, a top view of the same. Fig. 5, is a section showing the arrangement of one of the trolley wheels. The other figures are details.

In the figures: 1, is the slot in the top of the conduit, formed by means of the slot rails 2. These I have shown as composed of channel irons extending down below the top of the conduit and forming a second slot 3.

4, is one of the yokes used in forming the conduit, and 5, is the interior lining of the conduit. 6, represents the street paving.

7, are brackets secured to the sides of the conduit and carrying at their ends petticoated insulators 8.

9, are conductor or contact bars, secured to the insulators 8 by fastening clamps 10.

11, is the main conductor or feeder, which supplies the electric current to the bars 9.

12, are the trolley wheels which roll upon the bars 9 and form an electric connection with them. These wheels are connected by means described later on with the motors on the car above.

13, are boxes in which the wheels 12 are mounted. I have shown four of these, one at each corner of the trolley frame.

14, is the main body of the trolley frame, preferably of non-conducting material and turned down at the edges to constitute a petticoat for the trolley.

15, is a sheet-metal covering for the upper surfaces of the trolley. From the center of the trolley, arms extend upward through the slot to a point above the street level. The upper ends of these arms are provided with supports 16, which carry a cap that protects the upper ends of the trolley arms from water, dirt, &c.

17, are conducting strips in the trolley arms 18, and of course protected by insulation. The exterior surface of the trolley arm may be covered with sheet-metal to protect it.

19, is the cap over the top of the trolley arm, supported by the pieces 16.

20 are petticoated insulators, supported on brackets, 21, which are secured to the trolley arms, or if preferred, to the pieces 16, which may be extended sufficiently downward for that purpose.

22, is the gutter or depression in the middle of the body of the trolley, extending from end to end and under the slot, whose purpose is to receive any drippings from above and discharge them at the ends of the trolley into the space 23 at the bottom of the conduit.

24, are electric connections to join strips 17 to the motor on the car above, and 25, are connections surrounded with insulating material joining said strips with the trolley wheels.

26, represents chains connecting the trolley with a downwardly projecting bar 27, which is secured to the car. These bars project downwardly into the conduit at each end of the trolley and serve to move the trolley and cause it to travel with the car.

28, are metal plates secured to the trolley arms to protect them from wear by the edges of the slot.

29, are the bearings for the trolley wheel axles, secured to the inside of the boxes 13.

30, are grooves in the lower edges of the boxes 13, which convert said edges into a double petticoat.

Fig. 7, shows one form of clamp for securing the conductor bars 9 to the insulator 8. In cases, however, where the trolley depends upon the wheels 12 for its support, I prefer to arrange the bars 9 above the insulators, and in that case secure them by clamps of the form shown in Figs. 8 and 9. In any case, the bars 9, may be electrically connected with the feeder 11, either through these clamps, or in any other suitable manner. In some cases it may be desired to make the bars 9 continuous, and some parts of my invention may be used with such continuous conducting bars, ordinarily however the bars are independent of each other.

31, are wheels adapted to run upon the slot rails and to support the trolley when other support is lacking, as it would be when the trolley wheels are passing the spaces between the adjacent contact bars 9, or at crossings and switches. The wheels 31, are secured to trolley arms 18, by means of clamps 32 and bolts 33, by which they may be adjusted, if desired. I have shown them in the drawings as raised slightly above the slot rails to permit a proper pressure, due to the weight of the trolley, between the trolley wheels 12 and the conductor bars 9.

In Fig. 5, I have shown the trolley wheels as flanged, though they may be used, as shown in Fig. 1, without flanges.

In Figs. 10 to 16 inclusive I have shown the trolley in skeleton form and composed of tubes. In these figures 34 is the back bone from which rise the uprights 18 heretofore described. A good method of securing these parts together is shown in section in Fig. 14. The conducting strips 17 extend to the interior of the back bone. At each end of the back bone are cross pieces 35 connected at their ends to the wheel boxes 13. These cross pieces are depressed at their middle portions so that moisture will not flow on them toward the wheel boxes. The electric connections 25 are in the interior of the tubes 34 and 35 forming this frame and the tubes may be filled with an insulating material if desired. Fig. 16 shows a convenient method of bracing the trolley arms 18.

37 is a bar extending from wheel box to wheel box parallel with the back bone and 38 is a brace extending to the arm 18.

I claim—

1. In an electric railway, the combination with the slotted conduit, of a trolley mounted therein, and electrical connections extending from said trolley to the railway-car-motor, and to the feeder within the conduit; said trolley frame having its edges turned down to make it a petticoated insulator.

2. In an electric railway, the combination with the slotted conduit; of a trolley mounted therein and having the edges of its frame extended or turned downward; wheels supporting the trolley frame and located wholly inside the down-turned edges; and electrical connections extending from the trolley to the car-motor and to the feeder.

3. In an electric railway, the combination with the slotted conduit; of a trolley mounted therein and provided with an arm extending up through the slot; electrical connections extending from the trolley to the car-motor and to the feeder within the conduit; and the cap 19 carried by the arm.

4. In an electric railway, the combination with the slotted conduit; of a trolley mounted therein and provided with a gutter in line with the slot; an arm projecting from the gutter up through the slot, electrical connections passing through the arm from the trolley to the car-motor; a cap 19 at the upper end of the arm; and an electrical connection between the trolley and the feeder in the conduit,—all electrical connections of the trolley except the wheels being insulated.

5. In an electric railway, the combination with the slotted conduit; of an electric conductor or feeder therein; a contact bar; a trolley; wheels supporting said trolley frame upon the bars, and set inward away from the down-turned edges of the frame; and insulated electrical connections between the trolley wheels and the car-motor.

JAMES HERVEY BATES.

Witnesses:
ERASTUS D. MOORE,
DELLA A. McGOWAN.